(12) United States Patent
Yang et al.

(10) Patent No.: US 11,697,435 B1
(45) Date of Patent: Jul. 11, 2023

(54) HIERARCHICAL VEHICLE ACTION PREDICTION

(71) Applicant: PlusAI, Inc., Santa Clara, CA (US)

(72) Inventors: I-Hsuan Yang, Mountain View, CA (US); Yu Wang, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/078,529

(22) Filed: Dec. 9, 2022

(51) Int. Cl.
B60W 60/00 (2020.01)

(52) U.S. Cl.
CPC ..... B60W 60/0027 (2020.02); *B60W 2420/42* (2013.01); *B60W 2420/52* (2013.01); *B60W 2554/40* (2020.02)

(58) Field of Classification Search
None
See application file for complete search history.

(56) References Cited

U.S. PATENT DOCUMENTS

| | | | | |
|---|---|---|---|---|
| 2020/0051435 | A1* | 2/2020 | Hashimoto | G06T 11/001 |
| 2021/0370980 | A1* | 12/2021 | Ramamoorthy | G06V 20/56 |
| 2021/0406262 | A1* | 12/2021 | Unnikrishnan | G06F 16/248 |
| 2022/0156576 | A1* | 5/2022 | Rasouli | G06N 3/045 |

OTHER PUBLICATIONS

Feit et al, "Subgoal Planning Algorithm for Autonomous Vehicle Guidance", Cornell University Library, Apr. 27, 2020 (Year: 2020).*

* cited by examiner

*Primary Examiner* — Tamara L Weber
(74) *Attorney, Agent, or Firm* — Morgan, Lewis & Bockius LLP

(57) ABSTRACT

This application is directed to predicting vehicle actions according to a hierarchy of interconnected vehicle actions. The hierarchy of interconnected vehicle actions includes a plurality of predefined vehicle actions that are organized to define a plurality of vehicle action sequences. A first vehicle obtains one or more images of a road and a second vehicle, and predicts a sequence of vehicle actions of the second vehicle through the hierarchy of interconnected vehicle actions using the one or more images. The first vehicle is controlled to drive at least partially autonomously based on the predicted sequence of vehicle actions of the second vehicle. In some embodiments, the hierarchy of interconnected vehicle actions includes a first action level that is defined according to a stage of a trip and corresponds to three predefined vehicle actions of: "start a trip," "move in a trip," and "complete a trip."

20 Claims, 13 Drawing Sheets

1300

```
┌─────────────────────────────────────────────────────────────────────────┐
│ Obtain one or more images of a road with a second vehicle thereon 1304  │
└─────────────────────────────────────────────────────────────────────────┘
                                    ↓
┌─────────────────────────────────────────────────────────────────────────┐
│ Obtain a hierarchy of interconnected vehicle actions including a        │
│ plurality of predefined vehicle actions that are organized to define a  │
│ plurality of vehicle action sequences 1302                              │
│  ┌───────────────────────────────────────────────────────────────────┐  │
│  │ The hierarchy of interconnected vehicle actions includes a        │  │
│  │ plurality of action levels having a first action level, and the   │  │
│  │ first action level is defined according to a stage of a trip and  │  │
│  │ corresponds to three predefined vehicle actions of: starting the  │  │
│  │ trip, moving in the trip, and completing the trip, each of the    │  │
│  │ plurality of vehicle action sequences having a respective total   │  │
│  │ number of action levels 1310                                      │  │
│  └───────────────────────────────────────────────────────────────────┘  │
└─────────────────────────────────────────────────────────────────────────┘
                                    ↓
┌─────────────────────────────────────────────────────────────────────────┐
│ Predict a sequence of vehicle actions of the second vehicle through the │
│ hierarchy of interconnected vehicle actions using the one or more       │
│ images 1306                                                             │
│  ┌───────────────────────────────────────────────────────────────────┐  │
│  │ A machine learning model is is applied to process the one or more │  │
│  │ images to predict the sequence of vehicle actions of second       │  │
│  │ vehicle and configured to output an embedding vector, which is    │  │
│  │ projected to a feature vector including a plurality of elements   │  │
│  │ that are divided into a plurality of subsets of elements 1312     │  │
│  │  ┌─────────────────────────────────────────────────────────────┐  │  │
│  │  │ Each vehicle action of the predicted sequence of vehicle    │  │  │
│  │  │ actions corresponds to a distinct action level, and is      │  │  │
│  │  │ represented by a distinct subset of elements of the feature │  │  │
│  │  │ vector 1314                                                 │  │  │
│  │  └─────────────────────────────────────────────────────────────┘  │  │
│  └───────────────────────────────────────────────────────────────────┘  │
│  ┌───────────────────────────────────────────────────────────────────┐  │
│  │ The machine learning model includes a single end-to-end network   │  │
│  │ 1316                                                              │  │
│  └───────────────────────────────────────────────────────────────────┘  │
│  ┌───────────────────────────────────────────────────────────────────┐  │
│  │ The machine learning model includes a plurality of neural network │  │
│  │ models including a first neural network and a second neural       │  │
│  │ network coupled to the first neural network 1318                  │  │
│  │  ┌─────────────────────────────────────────────────────────────┐  │  │
│  │  │ Apply the first neural network to process the one or more   │  │  │
│  │  │ images and predict a first vehicle action of the sequence   │  │  │
│  │  │ of vehicle actions on a first action level 1320             │  │  │
│  │  └─────────────────────────────────────────────────────────────┘  │  │
│  │                              ↓                                    │  │
│  │  ┌─────────────────────────────────────────────────────────────┐  │  │
│  │  │ Select the second neural network from a set of candidate    │  │  │
│  │  │ neural networks based on the predicted first vehicle        │  │  │
│  │  │ action 1324                                                 │  │  │
│  │  └─────────────────────────────────────────────────────────────┘  │  │
│  │                              ↓                                    │  │
│  │  ┌─────────────────────────────────────────────────────────────┐  │  │
│  │  │ Apply a second neural network to predict a second vehicle   │  │  │
│  │  │ action of the sequence of vehicle actions on a second       │  │  │
│  │  │ action level following the first action level in the        │  │  │
│  │  │ hierarchy of interconnected vehicle actions 1322            │  │  │
│  │  └─────────────────────────────────────────────────────────────┘  │  │
│  └───────────────────────────────────────────────────────────────────┘  │
└─────────────────────────────────────────────────────────────────────────┘
                                    ↓
┌─────────────────────────────────────────────────────────────────────────┐
│ Control the first vehicle to at least partially autonomously drive      │
│ based on the predicted sequence of vehicle actions of the second        │
│ vehicle 1308                                                            │
└─────────────────────────────────────────────────────────────────────────┘
```

Figure 13

HIERARCHICAL VEHICLE ACTION PREDICTION

TECHNICAL FIELD

The present application generally relates to vehicle technology, and more particularly to, computer-aided methods and systems for predicting vehicle actions to facilitate autonomous vehicle control and/or planning.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

Autonomous vehicle control typically requires accurate prediction of vehicle actions (e.g., cutting in, slowing down). Deep learning techniques have been applied to predict target actions of a target vehicle and intermediate actions leading to the target actions, based on vehicle data collected in real time by an ego vehicle's sensors. Computer graphics techniques are applied to visualize trajectories corresponding to different target actions with their intermediate actions on a map. In some situations, deep learning techniques are used to predict the trajectories of target vehicles on a map. These deep learning techniques require vast computational resources, and may introduce latencies for predicting vehicle actions. As such, it is desirable to develop a more efficient and effective method for predicting a vehicle's actions to facilitate autonomous vehicle control and/or planning.

SUMMARY

This application is directed to methods, systems, and non-transitory computer readable storage media for predicting vehicle actions according to a predefined hierarchy of interconnected vehicle actions using deep learning techniques. The hierarchy of interconnected vehicle actions includes a plurality of predefined vehicle actions that are organized to define a plurality of vehicle action sequences. A machine learning model is trained to process one or more images of a road and a second vehicle and predict a sequence of vehicle actions of the second vehicle through the hierarchy of interconnected vehicle actions. Limited vehicle action sequences are predefined to be outputted by the machine learning model and for subsequent map rendering, if any. Vehicle action prediction is thereby simplified and expedited to efficiently and effectively facilitate autonomous vehicle control and planning.

In one aspect, a method is implemented for predicting vehicle actions at a first vehicle that includes one or more processors and memory. The method includes obtaining a hierarchy of interconnected vehicle actions including a plurality of predefined vehicle actions that are organized to define a plurality of vehicle action sequences. The method further includes obtaining one or more images of a road with a second vehicle thereon and predicting a sequence of vehicle actions of the second vehicle through the hierarchy of interconnected vehicle actions using the one or more images. The method further includes controlling the first vehicle to at least partially autonomously drive based on the predicted sequence of vehicle actions of the second vehicle. In some embodiments, each of the plurality of vehicle action sequences includes a respective subset of vehicle actions that are ordered according to a plurality of action levels. Each vehicle action in the respective subset of vehicle actions corresponds to a distinct one of the plurality of action levels. In some embodiments, the hierarchy of interconnected vehicle actions includes a plurality of action levels having a first action level. The first action level is defined according to a stage of a trip and corresponds to three predefined vehicle actions of: "start a trip," "move in the trip," and "complete a trip." Each of the plurality of vehicle action sequences has a respective total number of action levels According to another aspect of the present application, a first vehicle includes one or more processing units and memory having a plurality of programs stored in the memory. The programs, when executed by the one or more processing units, cause the first vehicle to perform any of the methods for predicting a second vehicle's actions for at least partially autonomously driving the first vehicle, as described above.

According to another aspect of the present application, a non-transitory computer readable storage medium stores a plurality of programs configured for execution by a first vehicle having one or more processing units. The programs, when executed by the one or more processing units, cause the first vehicle to perform any of the methods for predicting a second vehicle's actions for at least partially autonomously driving the first vehicle as described above.

BRIEF DESCRIPTION OF DRAWINGS

The accompanying drawings, which are included to provide a further understanding of the embodiments, are incorporated herein, constitute a part of the specification, illustrate the described embodiments, and, together with the description, serve to explain the underlying principles.

FIG. 13 is a flow diagram of an example method for predicting vehicle actions, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to predicting a sequence of vehicle actions based on at least one or more images captured by a camera or another sensor system of a first vehicle. Particularly, a hierarchy of interconnected vehicle actions is established, and includes a plurality of predefined vehicle actions that are organized according to a plurality of action levels to define a plurality of vehicle action sequences. After the one or more images of a road are obtained, the first vehicle applies a machine learning model to process the one or more images and predict the sequence of vehicle actions of a second vehicle through the hierarchy of interconnected vehicle actions. The first vehicle is controlled to drive at least partially autonomously based on the predicted sequence of vehicle actions of the second vehicle. In some embodiments, the sequence of vehicle actions are directly rendered on a map using computer graphics techniques. The application of this machine learning model avoids derivation of intermediate vehicle actions from a single target vehicle action, and simplifies a corresponding map rendering task that used to rely on a single target vehicle action. This application also avoids complex prediction tasks of predicting vehicle action in the form of detailed dynamics (e.g., velocity, acceleration, yaw rate, etc.). Vehicle actions and behaviors can thereby be predicted in an effective and efficient manner (e.g., by demanding less computational resources) to facilitate autonomous vehicle control and planning.

Figure 1:
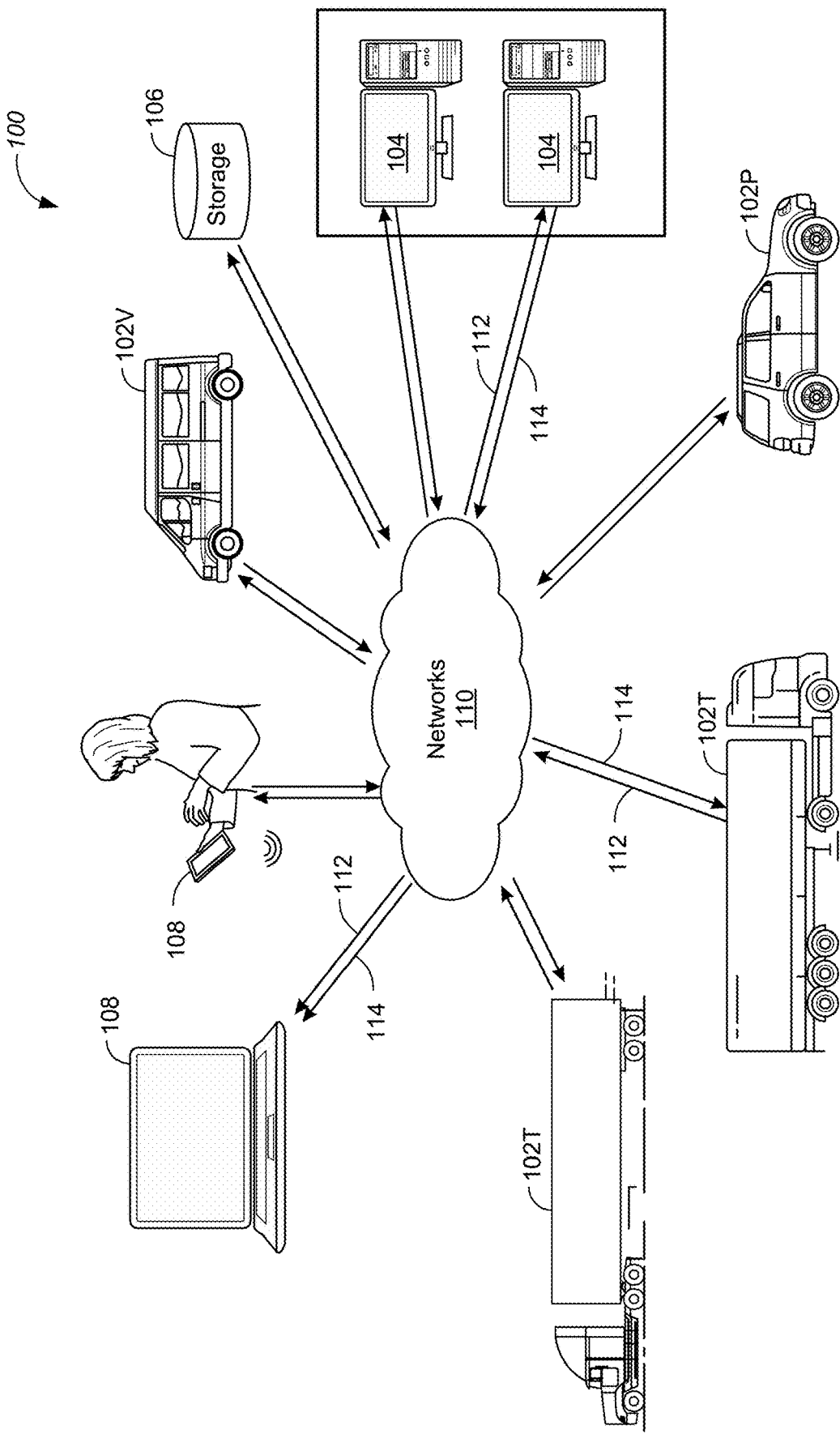
FIG. 1 is an example vehicle driving environment for a plurality of vehicles, in accordance with some embodiments.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; and/or (9) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g. level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

Figure 2:
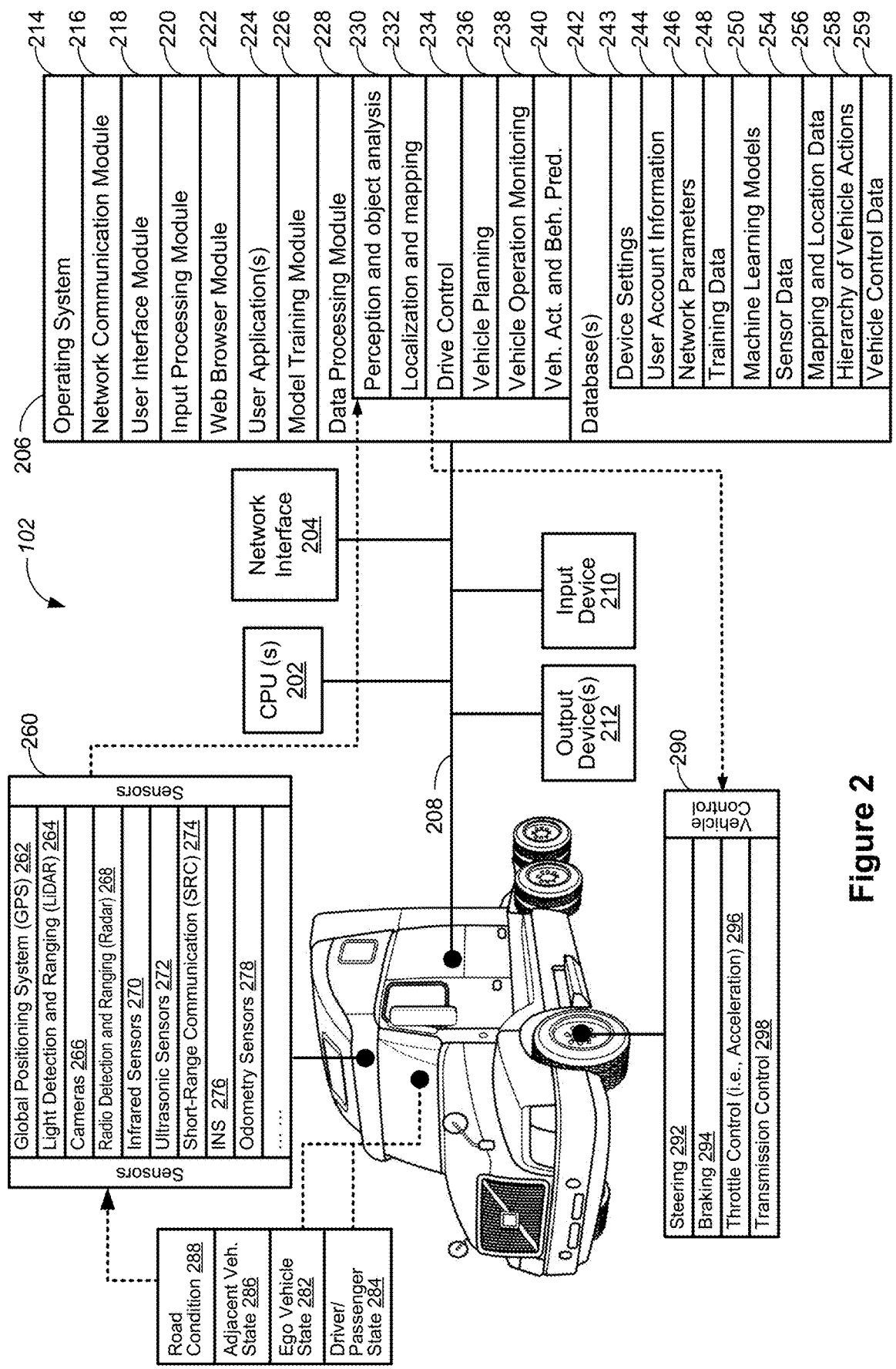
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

an operating system 214, which includes procedures for handling various basic system services and for performing hardware dependent tasks;

a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;

a user interface module 218, which enables presentation of information (e.g., a graphical user interface for an application 224, widgets, websites and web pages thereof, audio content, and/or video content) at the vehicle 102 via one or more output devices 212 (e.g., displays or speakers);

an input processing module 220, which detects one or more user inputs or interactions from one of the one or more input devices 210 and interprets the detected input or interaction;

a web browser module 222, which navigates, requests (e.g., via HTTP), and displays websites and web pages thereof, including a web interface for logging into a user account of a user application 224 associated with the vehicle 102 or another vehicle;

one or more user applications 224, which are executed at the vehicle 102. The user applications 224 include a vehicle user application that controls the vehicle 102 and enables users to edit and review settings and data associated with the vehicle 102;

a model training module 226, which trains a machine learning model 250. The model 250 includes at least one neural network and is applied to process vehicle data (e.g., sensor data and vehicle control data) of the vehicle 102;

a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;

a vehicle database 242, which stores vehicle data 112, including:
  device settings 243, including common device settings (e.g., service tier, device model, storage capacity, processing capabilities, communication capabilities, and/or medical procedure settings) of the vehicle 102;
  user account information 244 for the one or more user applications 224 (e.g., user names, security questions, account history data, user preferences, and predefined account settings);
  network parameters 246 for the one or more communication networks 110, (e.g., IP address, subnet mask, default gateway, DNS server, and host name);
  training data 248 for training the machine learning model 250;
  machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;
  sensor data 254 captured or measured by the plurality of sensors 260;
  mapping and location data 256, which is determined from the sensor data 254 to map the vehicle driving environment 100 and locations of the vehicle 102 in the environment 100;
  a hierarchy of interconnected vehicle actions 258 including a plurality of predefined vehicle actions that are organized to define a plurality of vehicle action sequences; and
  vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
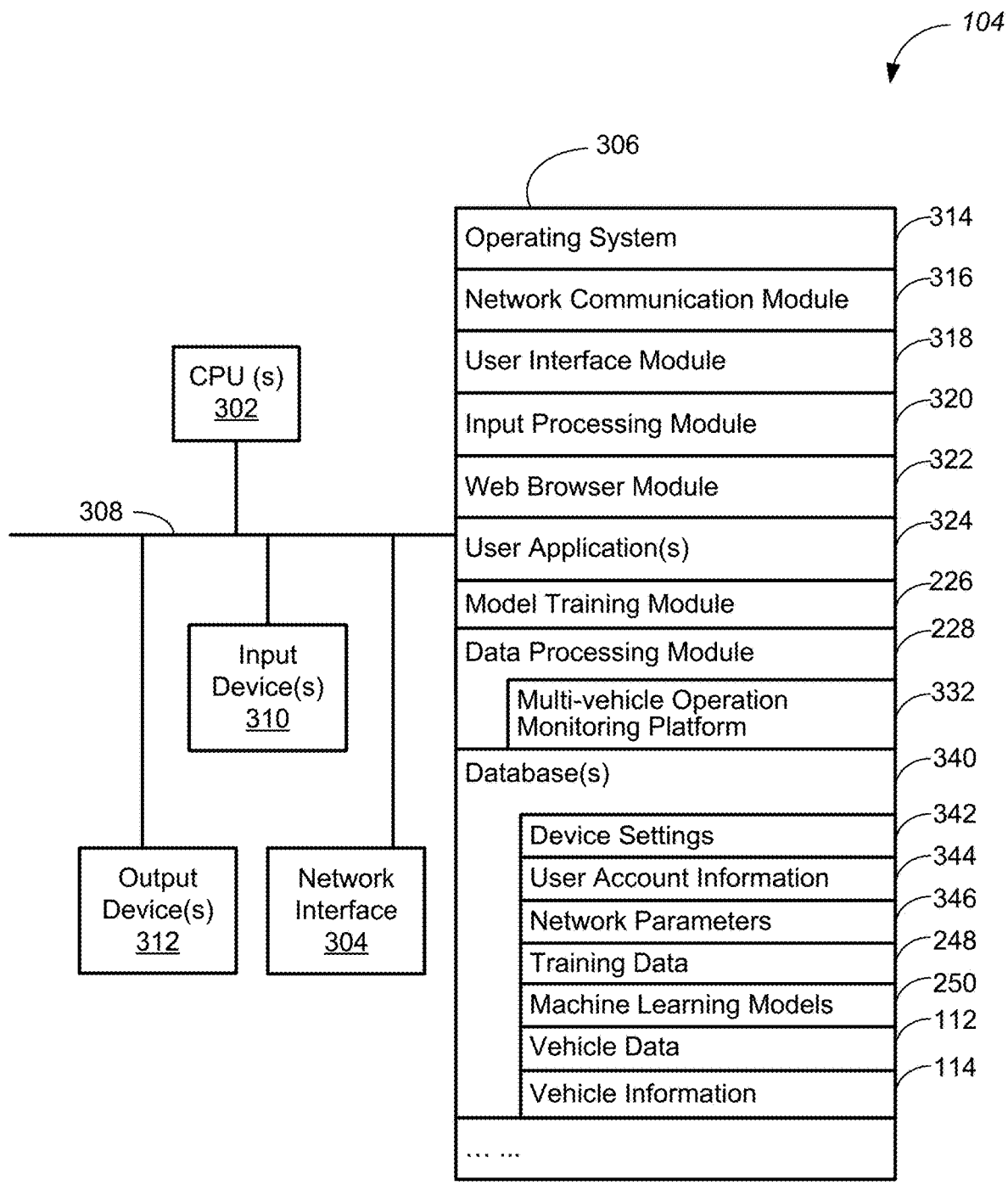
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

an operating system 314, which includes procedures for handling various basic system services and for performing hardware dependent tasks;

a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;

a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which are executed at the server 104. The user applications 324 include a vehicle user application that associates vehicles 102 with user accounts and facilitates controlling the vehicles 102, and enables users to edit and review settings and data associated with the vehicles 102;

a model training module 226, which trains a machine learning model 250, where the model 250 includes at least one neural network and is applied to process vehicle data (e.g., sensor data and vehicle control data) of one or more vehicles 102;

a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);

vehicle server data 340, including:
  device settings 342, which include common device settings (e.g., service tier, device model, storage capacity, processing capabilities, communication capabilities, and/or medical procedure settings) of the server 104;
  user account information 344 for the one or more user applications 324 (e.g., user names, security questions, account history data, user preferences, and predefined account settings);
  network parameters 346 for the one or more communication networks 110, (e.g., IP address, subnet mask, default gateway, DNS server, and host name);
  training data 248 for training the machine learning model 250;
  machine learning models 250 for processing vehicle data;
  vehicle data 112, which is collected from a plurality of vehicles 102 and includes sensor data 254, mapping and location data 256, and vehicle control data 259; and
  additional vehicle information 114, including vehicle operation information, fault information, and/or driving solution information, which are generated from the collected vehicle data 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
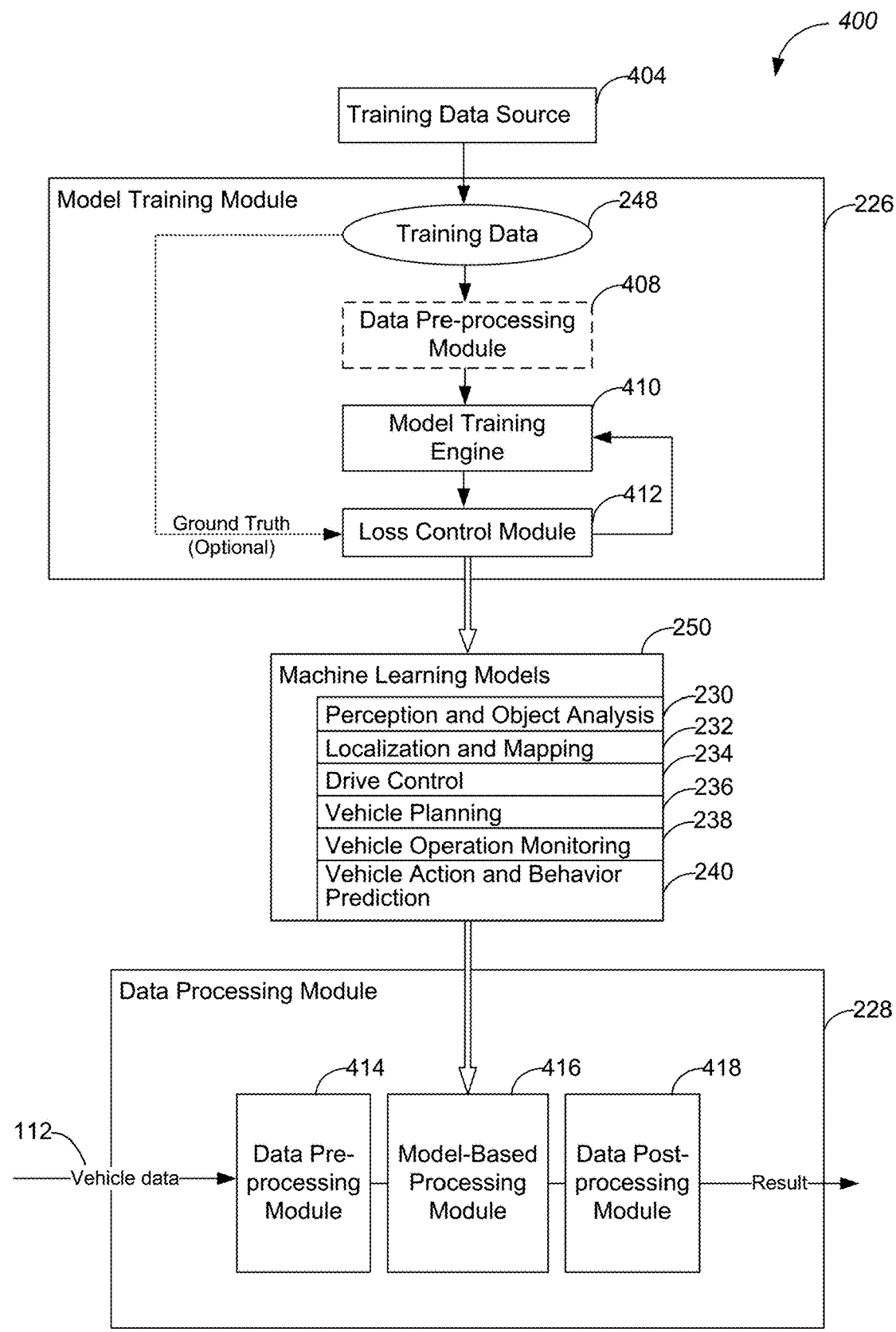
FIG. 4 is a block diagram of a machine learning system for training and applying vehicle data processing models for facilitating at least partial autonomous driving of a vehicle, in accordance with some embodiments.
Figure 5A:
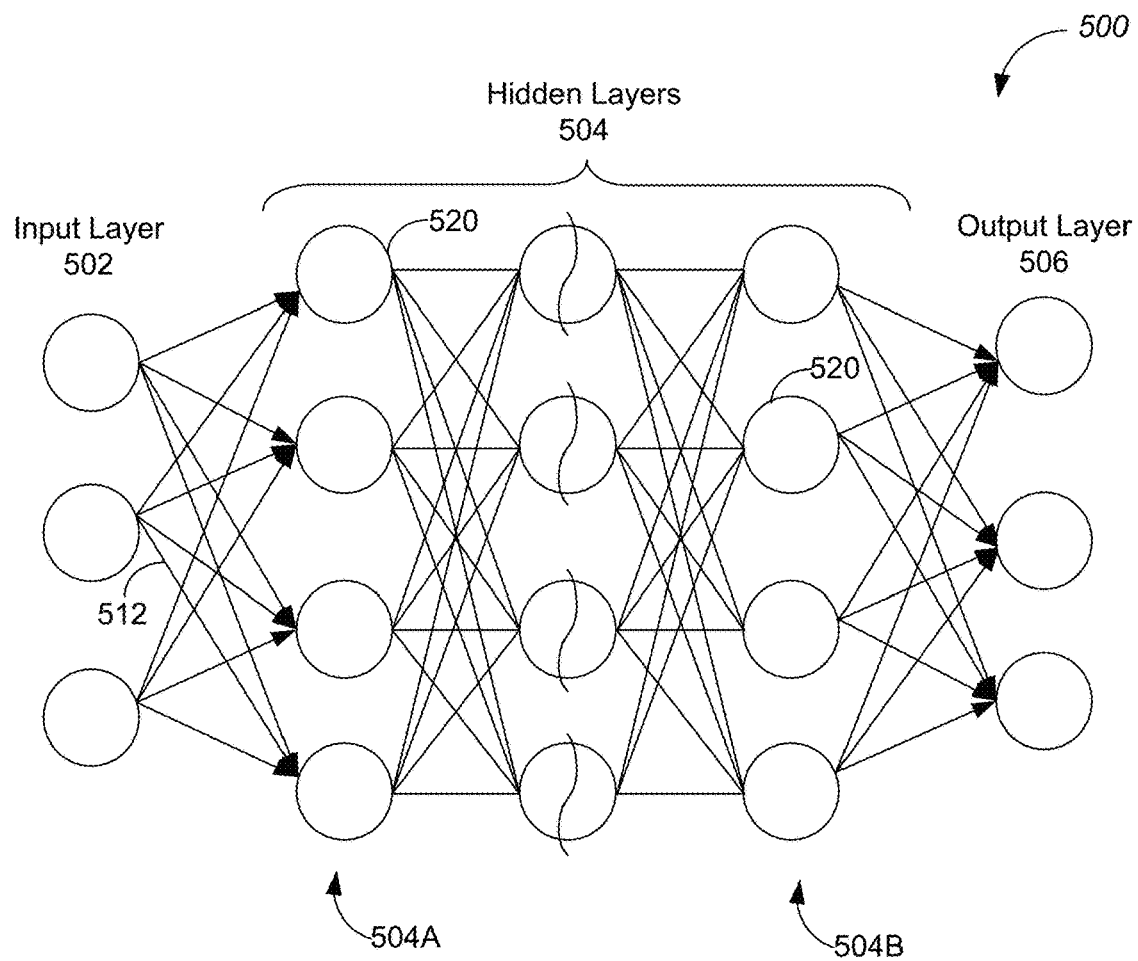
FIG. 5A is a structural diagram of an example neural network applied to process vehicle data in a vehicle data processing model, in accordance with some embodiments.
Figure 5B:
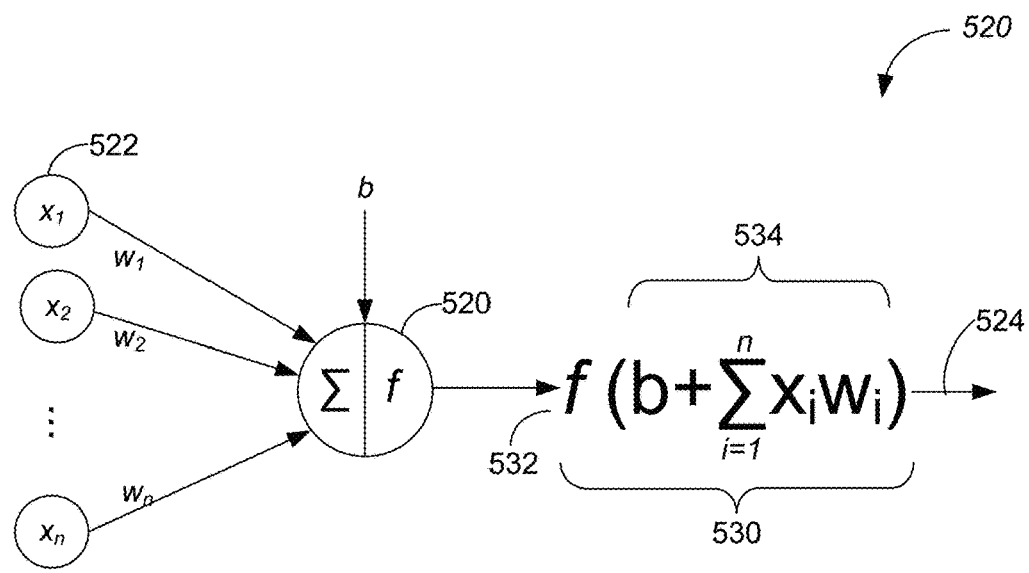
FIG. 5B is an example node in the neural network, in accordance with some embodiments.
Figure 6:
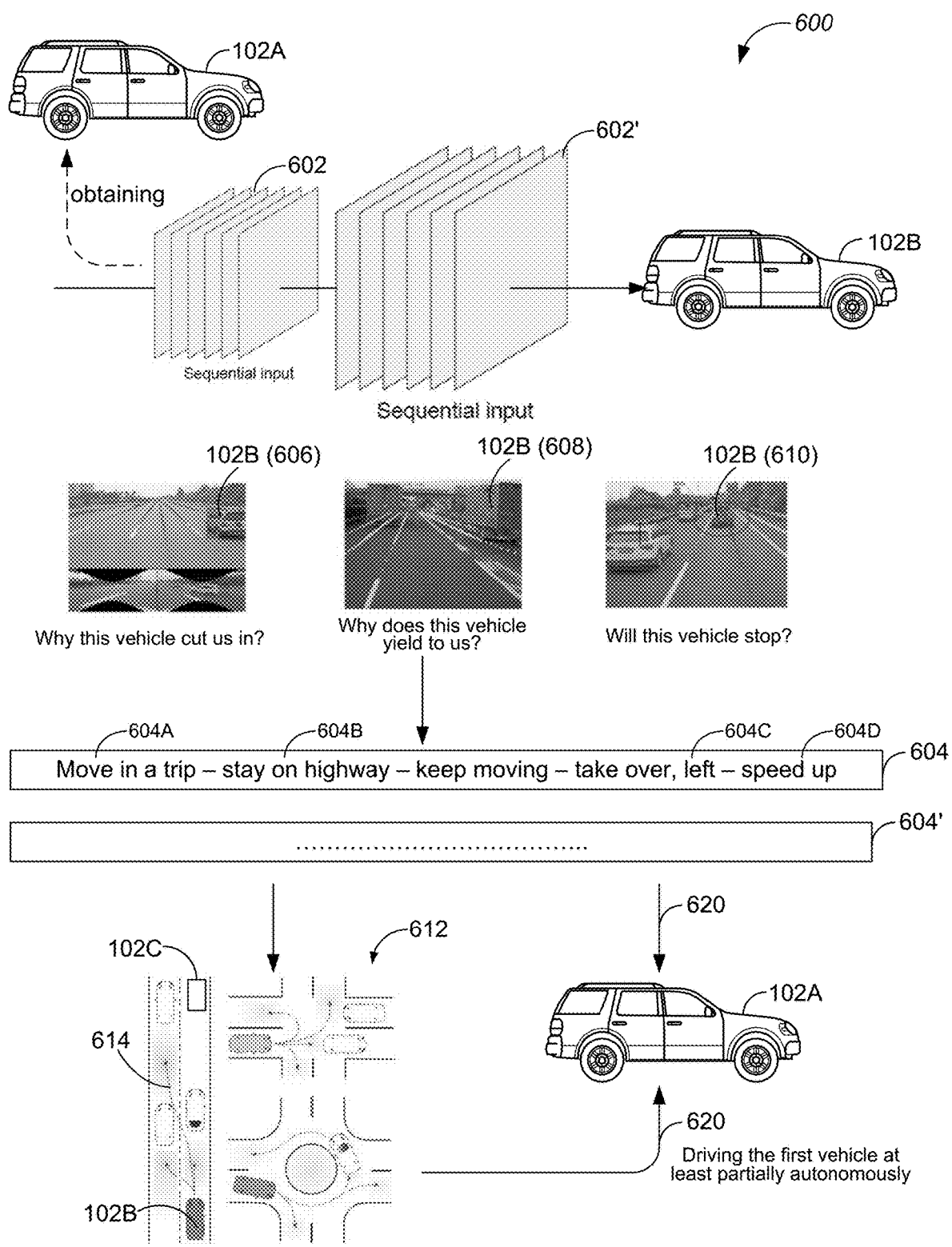
FIG. 6 is a flow diagram of an example process for predicting vehicle actions, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from a another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240. Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 402 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a pre-defined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

FIG. 6 is a flow diagram of an example process 600 for predicting vehicle actions, in accordance with some embodiments. The process 600 is implemented by a first vehicle 102A having one or more processors (e.g., processing unit(s) 202 in FIG. 2) and memory (e.g., memory 206 in FIG. 2). The first vehicle 102A obtains one or more images 602 of a road and a second vehicle 102B. In some embodiments, one or more cameras 266 of the first vehicle 102A captures the one or more images 602 (e.g., color images). In some embodiments, a LiDAR scanner 264 of the first vehicle 102A captures the one or more images 602 (e.g., a LiDAR image or point field). In some embodiments, the first vehicle 102A receives the one or more images 602 from a camera (e.g., a camera of a mobile phone or an adjacent vehicle 102) distinct from its own camera 266. In some embodiments, the one or more images 602 includes an ordered sequence of images captured according to a refresh rate (e.g., 30 frames per second). In some embodiments, the one or more images 602 includes a subset of images sampled from the ordered sequence of images that is captured according to the refresh rate. The first vehicle 102A processes the one or more images 602 to predict a sequence of vehicle actions 604 of a second vehicle 102B and control (620) the first vehicle 102A to drive at least autonomously based on the sequence of vehicle actions 604 of the second vehicle 102B.

In some embodiments, the first vehicle 102A is an ego vehicle configured to capture the one or more images 602 of the road on which the ego vehicle is driving, and the second vehicle 102B includes an obstacle vehicle in a field of view of the ego vehicle. The ego vehicle is controlled to drive at least partially autonomously based on the sequence of vehicle actions 604 of the obstacle vehicle. Alternatively, in some embodiments, the second vehicle 102B is the first vehicle 102A, and the one or more images 602 of the road are captured by a camera 266 of the first vehicle 102A. For example, while the first vehicle 102A is manually controlled, the first vehicle 102A predicts its own sequence of vehicle actions 604, which is used for subsequent autonomous driving of the first vehicle 102A. In some situations, the first vehicle 102A determines that a driver is operating the vehicle in an unsafe or abnormal manner based on the sequence of vehicle actions 604, and displays an alert or a request for enabling an autonomous driving mode.

A hierarchy of interconnected vehicle actions 258 is predefined and includes a plurality of vehicle action sequences. The sequence of vehicle actions 604 is one of the plurality of vehicle action sequences. Each of the plurality of vehicle action sequences includes a respective subset of vehicle actions that are ordered according to a plurality of action levels. Each vehicle action in the respective subset of vehicle actions corresponds to a distinct one of the plurality of action levels. For example, the sequence of vehicle actions 604 is one of the plurality of vehicle action sequences in the hierarchy of interconnected vehicle actions 258, and includes an ordered sequence of vehicle actions corresponding to five action levels. A highest level (i.e., a first level) of the sequence of vehicle actions 604 is "move in a trip," indicating that the second vehicle 102B captured in the one or more images 602 intends to during in a trip.

In some embodiments, a machine learning model 250 (e.g., a vehicle action and behavior prediction module 240 in FIGS. 2 and 4) is applied to process the one or more images 602 and predict the sequence of vehicle actions 604 of the second vehicle 102B through the hierarchy of interconnected vehicle actions 258. The sequence of vehicle actions 604 includes two or more vehicle actions each of which corresponds to a distinct one of the action levels. In some embodiments, the machine learning model 250 includes a single end-to-end neural network configured to generate a vector identifying each and every of the two or more vehicle actions in the sequence of vehicle actions 604 of the second vehicle 102B. Alternatively, in some embodiments, the machine learning model 250 includes a series of neural network models that are coupled to each other in a series. Each of the series of neural network models provides an output defining a respective vehicle action in a respective action level for the sequence of vehicle actions 604 of the second vehicle 102B. The outputs of the series of neural network models jointly define the vehicle actions in the sequence of vehicle actions 604.

Note that the vehicle actions in the sequence of vehicle actions 604 of the second vehicle 102B have not occurred yet. Each vehicle action represents a prediction of the intended action of the second vehicle 102B at a respective action level. Examples of the intended action of the second vehicle 102B include, but are not limited to, whether the second vehicle 102 will cut in front of the first vehicle 102A (606), whether the second vehicle 102B will yield to the first vehicle 102A (608), or whether the second vehicle 102B will stop (610). For each vehicle action, the respective action level is higher than a next action level of a next vehicle action that immediately follows the respective vehicle action. In some situations, a first action level corresponds to the highest level of the sequence of vehicle actions 604. The first action level (e.g., corresponding to "move in a trip" 604A) is broader than a second action level (e.g., corresponding to "stay on highway" 604B) that follows the first action level, while the second action level is more specific than the first action level. In some situations, a fourth action level (e.g., corresponding to "take over, left" 604D) temporally occurs prior to a fifth action level (e.g., corresponding to "speed up" 604E) that follows the fourth action level. Stated another way, in some embodiments, the sequence of vehicle actions 604 predicted by the first vehicle 102A include intended actions of the second vehicle 102B that are ordered according to a broadness level, a temporal order, or a combination thereof.

In some embodiments, the sequence of vehicle actions 604 is predicted for a subsequent duration of time (e.g., next 10 seconds, which is shorter than a threshold duration). The first vehicle 102A obtains additional images 602' of the road and second vehicle 102B while processing the one or more images 602 that have been obtained to predict the sequence of vehicle actions. The additional images 602' of the road and second vehicle 102B are applied to predict the next sequence of vehicle actions 604' that follows the sequence of vehicle actions 604. Alternatively, in some embodiments, the sequence of vehicle actions 604 is predicted for an extended duration of time (e.g., one minute, which is greater than a threshold duration). The first vehicle 102A obtains additional images 602' of the road and second vehicle 102B while processing the one or more images 602 that have been obtained to predict the sequence of vehicle actions 604. The additional images 602' of the road and second vehicle 102B are applied to update the sequence of vehicle actions 604 or predict a next sequence 604' of vehicle actions that follows the sequence of vehicle actions 604. Stated another way, the first vehicle 102A applies the machine learning model 250 to predict subsequent vehicle actions continuously and dynamically.

In some embodiments, the first vehicle 102A executes a vehicle user software application that controls (620) the vehicle 102 and enables users to edit and review settings and data associated with the first vehicle 102A. The vehicle user application is configured to enable a graphical user interface (GUI) for the first vehicle 102A. In some embodiments, in accordance with the predicted sequence of vehicle actions 604 of the second vehicle 102B, the first vehicle 102A displays a visualziation on the GUI of the first vehicle 102A on a map 612 including a vehicle trajectory 614 of the second vehicle 102B. The map 612 is updated as a position of the first vehicle 102A changes, and the vehicle trajectory 614 is updated based on the sequence of vehicle actions 604 that are continuously and dynamically predicted from the one or more images 602.

In some embodiments, the first vehicle 102A identifies the second vehicle 102B in the one or more images 602, and determines whether the second vehicle 102B is located within a predefined distance (e.g., 100 meters) of the first vehicle 102A. In accordance with a determination that the second vehicle 102B is within the predefined distance, the first vehicle 102A applies the machine learning model 250 to predict the sequence of vehicle actions 604 of the second vehicle 102B. Conversely, in accordance with a determination that the second vehicle 102B exceeds the predefined distance, the first vehicle 102A aborts applying the machine learning model 250 to predict the sequence of vehicle actions 604 of the second vehicle 102B.

In some embodiments, the field of view of the first vehicle 102A includes one or more third vehicles 102C. The first vehicle 102A applies the machine learning model 250 to process the one or more third images 102C captured in the one or more images 602 and to predict a respective sequence of vehicle actions of each third vehicle 102C through the hierarchy of interconnected vehicle actions 258. The first vehicle is controlled (620) to drive at least partially autonomously based on the predicted sequence of vehicle actions of the second vehicle 102B and third vehicle(s) 102C. Additionally, in some embodiments, the first vehicle 102A identifies each third vehicle 102C in the one or more images 602, and determines whether the third vehicle 102C is located within a predefined distance (e.g., 100 meters) of the first vehicle 102A. In accordance with a determination whether each third vehicle 102C is within the predefined distance, the first vehicle 102A applies or aborts applying the machine learning model 250 to predict the sequence of vehicle actions of the respective third vehicle 102C.

FIGS. 7-10 provide an example hierarchy of interconnected vehicle actions 258 described herein. The hierarchy of interconnected vehicle actions 258 includes at least five action levels, e.g., a first action level (Level 1), a second action level (Level 2), a third action level (Level 3), a fourth action level (Level 4), and a fifth action level(Level 5). In some embodiments, the first action level (Level 1) is defined according to a stage of a trip, and for example, corresponds to vehicle actions of "start a trip," "move in a trip," and "complete a trip". In some embodiments, the second action level (Level 2) is defined according to a routing section, and for example, corresponds to vehicle actions related to highway or local area (e.g., see FIG. 10). In some embodiments, the third action level (Level 3) is defined according to a routing target, and for example, corresponds to a vehicle action of "head to ramp," e.g., "get onto ramp" or "get off ramp" in FIG. 10. In some embodiments, the fourth action level (Level 4) is defined according to a lane level intended action, and for example, corresponds to vehicle actions of "take over," "change lane," and "follow lane," also shown in FIG. 10. In some embodiments, the fifth action level (Level 5) is defined according to an operation level maneuver, and for example, corresponds to vehicle actions of "speed up," "slow down," and "turn," also shown in FIG. 10.

The plurality of predefined vehicle actions in the hierarchy of interconnected vehicle actions 258 are organized to define a plurality of vehicle action sequences. Each of the plurality of vehicle action sequences includes a respective subset of vehicle actions, and each vehicle action in the respective subset of vehicle actions corresponds to a respective distinct action level of the plurality of action levels compared with any remaining vehicle actions in the respective subset.

In some embodiments, each vehicle action sequence has a sequential nature of vehicle actions. Once a general purpose is identified, a sequence of vehicle actions (also called intentions or intended actions) is also defined. For example, for a vehicle 102 intending to exit a highway, the vehicle 102 will change lanes and exit the highway. In another example, for a vehicle 102 intending to take over another vehicle, the vehicle 102 will speed up, change lanes, and then move back to its original lane. Such sequential vehicle actions have a high probability along a path through the hierarchical vehicle actions in the hierarchy of interconnected vehicle actions 258. In some embodiments, the hierarchy of interconnected vehicle actions 258 is defined based on human knowledge. Known sequences of vehicle actions having high probabilities are organized into a decision tree structure of the hierarchy of interconnected vehicle actions 258. Alternatively, in some embodiments, the structure of the hierarchy of interconnected vehicle actions 258 is established based on a corpus of training data.

In some embodiments, for each vehicle action in a vehicle action sequence, the respective action level is higher than a next action level of a next vehicle action that immediately follows the respective vehicle action. A higher action level is broader than a lower action level. For example, a first action level corresponds to the highest level of the sequence of vehicle actions 604. The first action level (e.g., "move in a trip") is broader than a second action level (e.g., "stay on highway") that follows the first action level, while the second action level is more specific than the first action level. That said, the plurality of action levels of the hierarchy of interconnected vehicle actions 258 are ordered according to a broadness level, and a lower action level (e.g., Level 4) provides details to a higher action level (e.g., Level 1).

In some embodiments, the predicted sequence of vehicle actions 604 satisfies a high frequency action sequence criterion. A vehicle control plan is adjusted in accordance with a determination that the predicted sequence of vehicle actions satisfies the high frequency action sequence criterion. For example, the second vehicle 102B constantly overtakes other vehicles. For safety, the first vehicle 102A may vary the vehicle control plan to drive conservatively (e.g., by avoid switching lanes, keeping a distance from the second vehicle 102B, staying in a distinct lane), if the first vehicle 102A is close to the second vehicle 102B. In some embodiments, the predicted sequence of vehicle actions 604 satisfies a high frequency action sequence criterion. The hierarchy of interconnected vehicle actions 258 is adjusted in accordance with a determination that the predicted sequence of vehicle actions satisfies the high frequency action sequence criterion.

Figure 7:
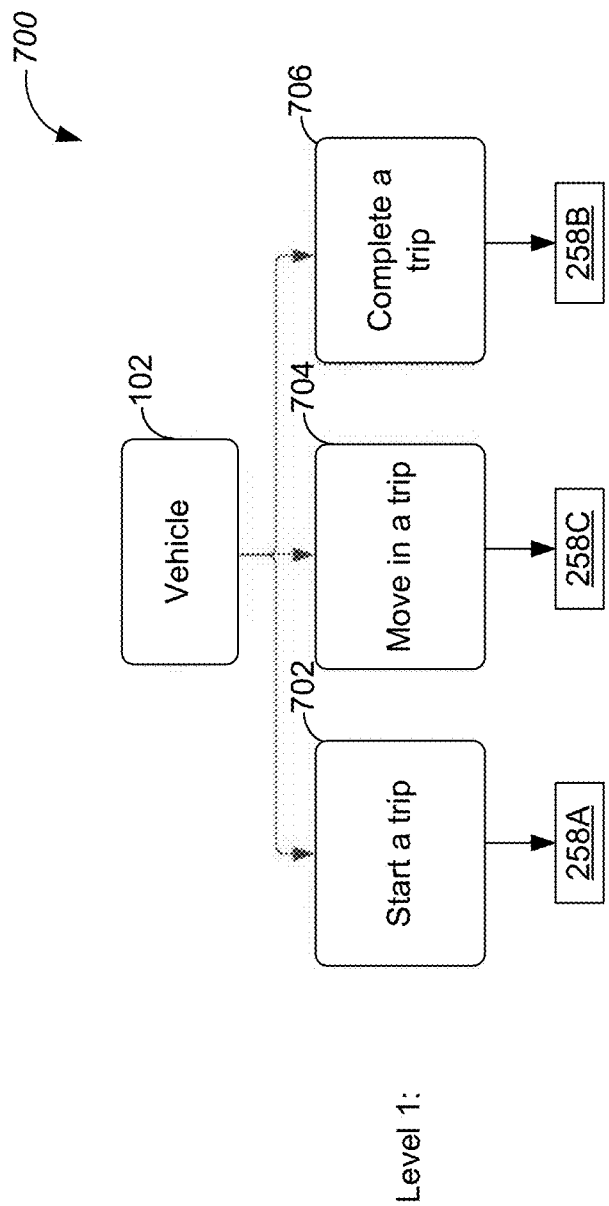
FIG. 7 is a schematic diagram of a first action level (Level 1) of an example hierarchy of interconnected vehicle actions, in accordance with some embodiments.

FIG. 7 is a schematic diagram of a first action level (Level 1) of an example hierarchy of interconnected vehicle actions 258, in accordance with some embodiments. The hierarchy of interconnected vehicle actions 258 includes a plurality of action levels having the first action level (Level 1) as the highest action level of the hierarchy of interconnected vehicle actions 258. The first action level (Level 1) is defined according to a stage of a trip and corresponds to three predefined vehicle actions of: "start a trip" 702, "move in a trip" 704, and "complete a trip" 706. The machine learning model 250 is applied to determine at least the stage of the trip.

Figure 8:
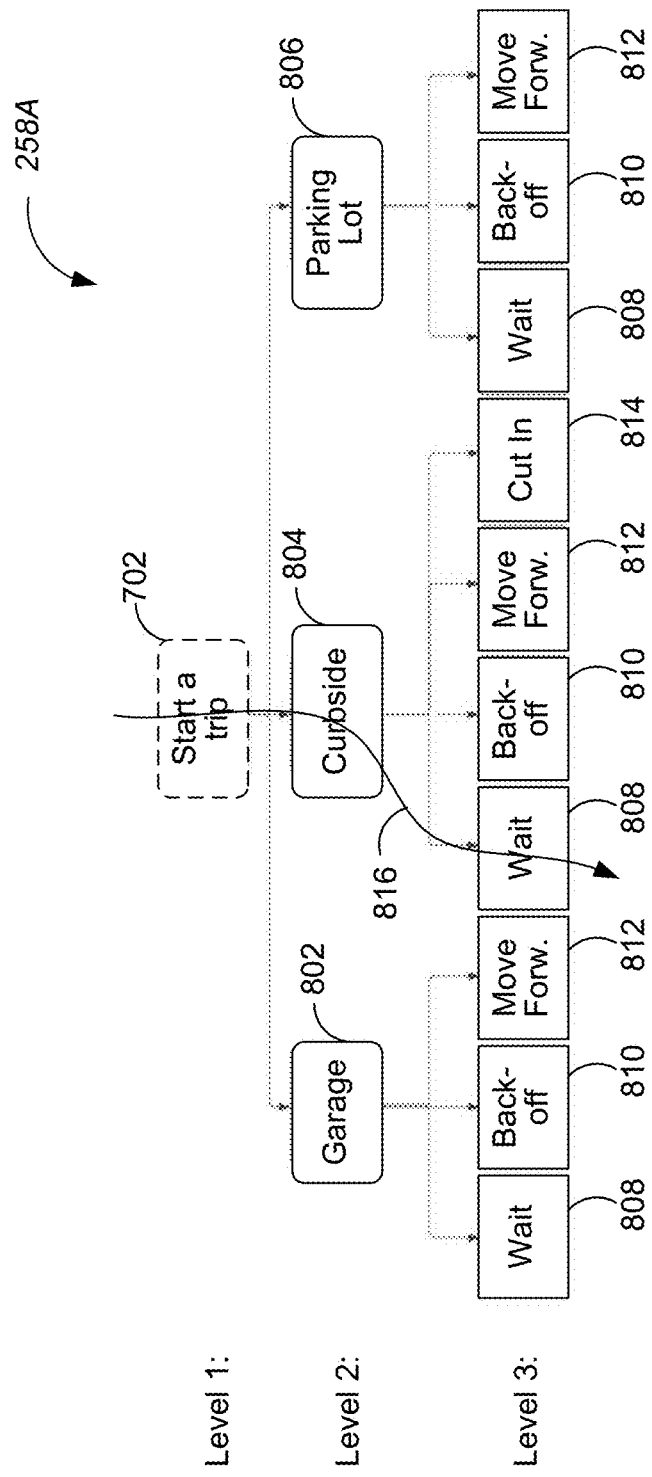
FIGS. 8, 9, and 10 are a schematic diagrams of three subsets of an example hierarchy of interconnected vehicle actions having predefined vehicle actions of "start a trip," "complete a trip," and "move in a trip" on a first action level, in accordance with some embodiments, respectively.
Figure 9:
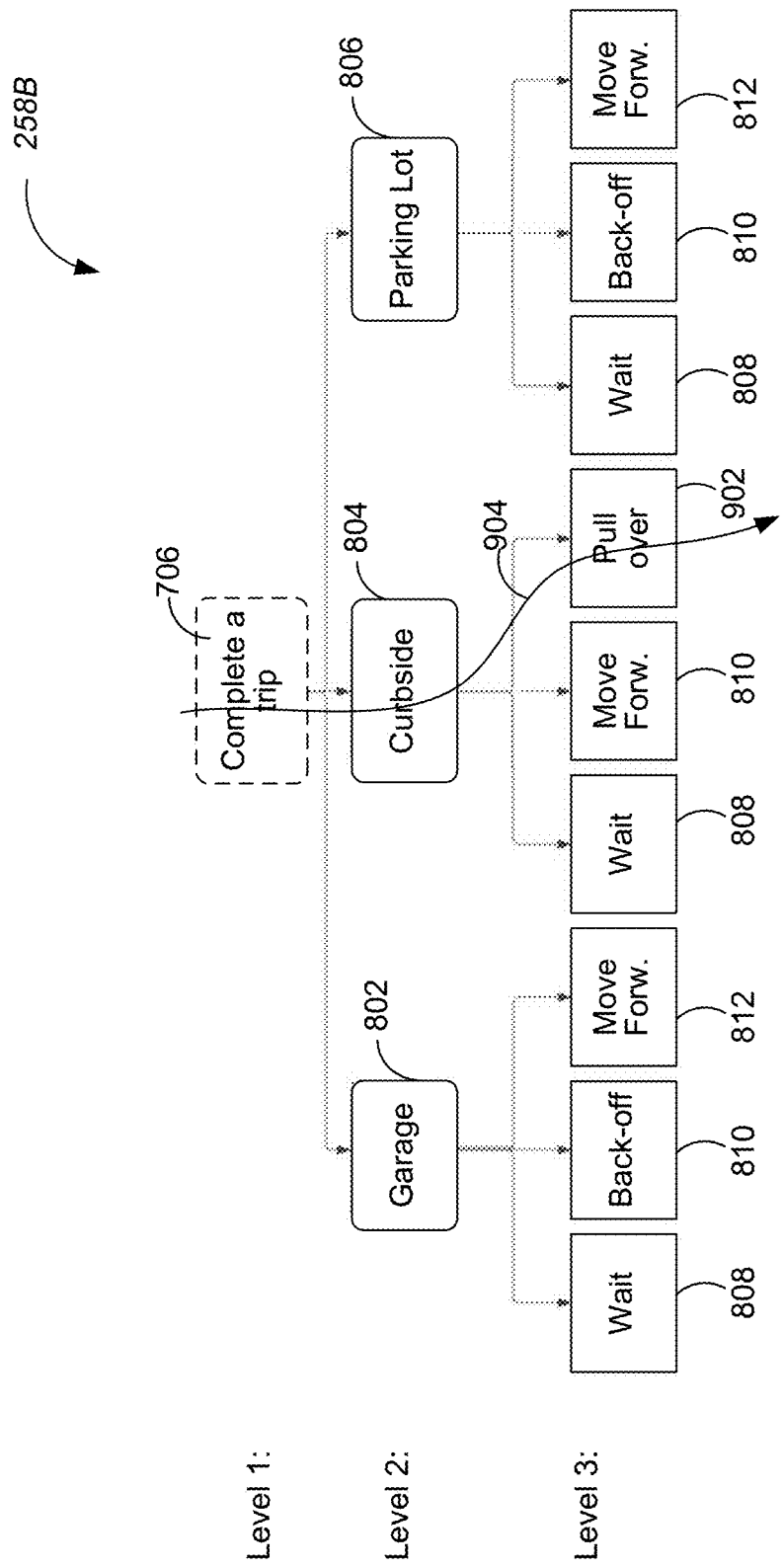
Figure 10:
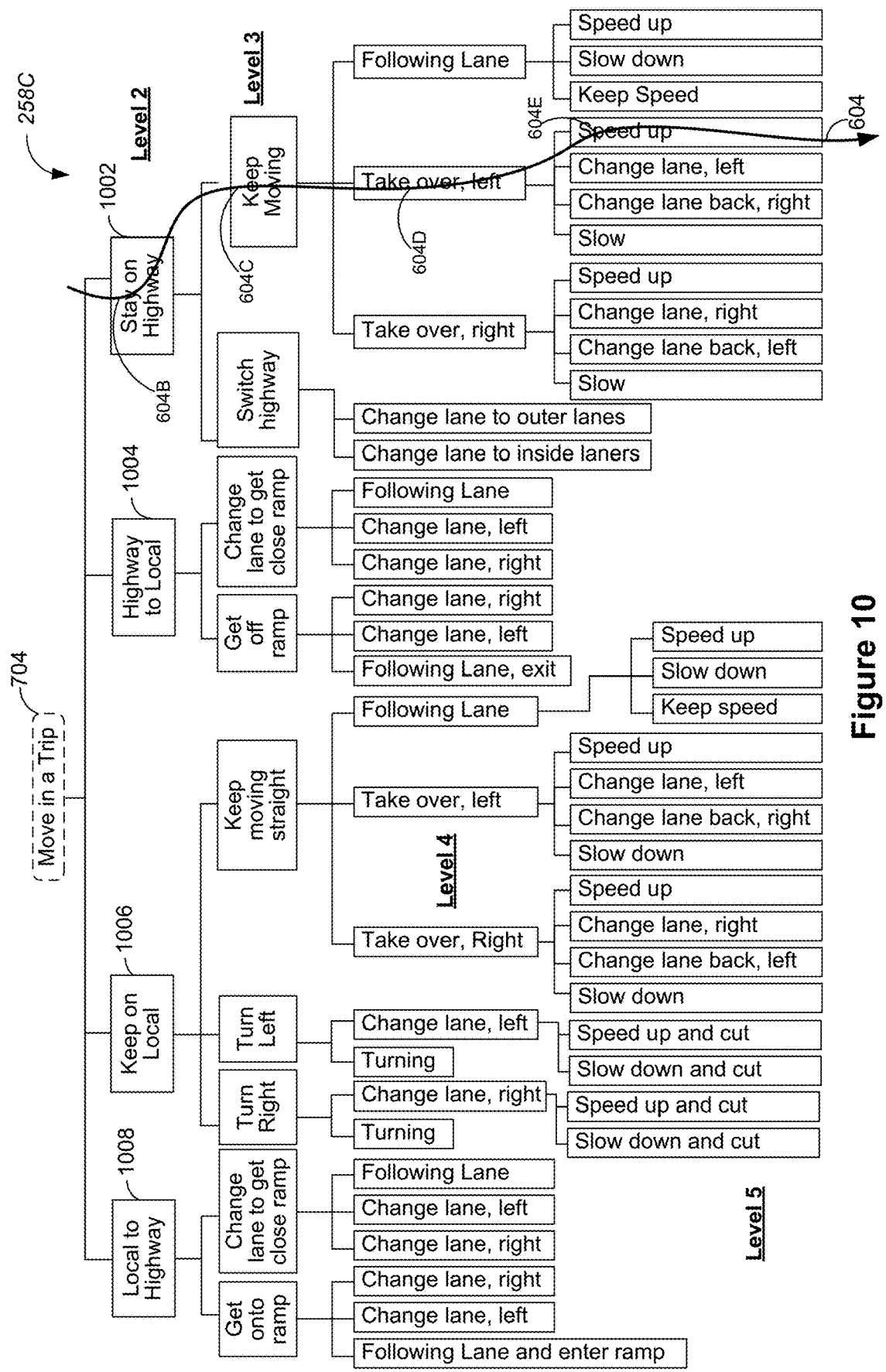

FIGS. 8, 9, and 10 are a schematic diagrams of three subsets of an example hierarchy of interconnected vehicle actions 258A, 258B, and 258C having predefined vehicle actions of "start a trip" 702, "complete a trip" 706, and "move in a trip" 704 on a first action level, in accordance with some embodiments, respectively. Each of the plurality of vehicle action sequences having a respective total number of action levels. Referring to FIG. 8, in some embodiments, the subset of the hierarchy of interconnected vehicle actions 258A has the predefined vehicle action of "start a trip" 702 on the first action level (Level 1), and each vehicle action sequence associated with "start a trip" 702 includes three action levels and three actions on the second action level. Further, in some embodiments, the second action level (Level 2) immediately follows the first action level (Level 1), and corresponds to a group consisting of "garage" 802 (i.e., the vehicle is in a garage), "curbside" 804 (i.e., the vehicle is next to a curb), and "parking lot" 806 (i.e., the vehicle is in a parking lot). The third action level (Level 3) immediately follows the second action level (Level 2), and each vehicle action 802, 804, or 806 corresponds to a respective subset of a group consisting of: "wait" 808 (i.e., the vehicle is waiting), "backoff" 810 (i.e., the vehicle is backing off), "move forward" 812 (i.e., the vehicle is moving forward), and "cut in" 814 (i.e., the vehicle is cutting in). In an example, a predicted sequence of vehicle actions 816 starts with "start a trip" 702 on the first action level (Level 1), and continues to "curbside" 804 on the second action level (Level 2) followed by "wait" 808 on the third action level (Level 3). In other words, the vehicle starts a trip from a curb by waiting for the next action.

Referring to FIG. 9, in some embodiments, the subset of the hierarchy of interconnected vehicle actions 258B has the predefined vehicle action of "complete a trip" 704 (i.e., by arriving at a destination) on the first action level (Level 1), and includes three action levels and three actions on the second action levels. Further, in some embodiments, the second action level (Level 2) immediately follows the first action level (Level 1), corresponds to a group consisting of "garage" 802, "curbside" 804, and "parking lot" 806, similar to FIG. 8. The third action level (Level 3) immediately follows the second action level (Level 2), and each vehicle action 802, 804, or 806 corresponds to a respective subset of a group consisting of: "wait" 808 (i.e., the vehicle is waiting), "backoff" 810 (i.e., the vehicle is backing off), "move forward" 812 (i.e., the vehicle is moving forward), and "pull over" 902 (i.e., the vehicle is pulling over). In an example, a predicted sequence of vehicle actions 904 starts with "complete a trip" 706 on the first action level (Level 1), and continues to "curbside" 804 on the second action level (Level 2) and "pull over" 914 on the third action level (Level 3). In other words, the vehicle completes its trip by pulling over to the curb.

Referring to FIG. 10, in some embodiments, the subset of the hierarchy of interconnected vehicle actions 258C has the predefined vehicle action of "move in a trip" 704 on the first action level (Level 1), which is not shown in FIG. 10. Each vehicle action sequence associated with moving in the trip 704 includes four or more levels, e.g., four levels, five levels. In some embodiments, the first action level (Level 1) of the predicted sequence of vehicle actions 604 corresponds to a first vehicle action of "move in a trip" 704. The second action level (Level 2) of the predicted sequence of vehicle actions 604 immediately follows the first action level (Level 1), and corresponds to a second vehicle action selected from a group consisting of: "keep on highway" 1002, "highway to local" 1004, "keep on local" 1006, and "local to highway" 1008. The predicted sequence of vehicle actions 604 has two or three additional actions (e.g., 604C-604E) each of which is on a distinct action level (e.g., Level 3, 4, or 5). More details on vehicle actions of lower actions levels (e.g., Levels 3-5) are shown in FIG. 10.

Specifically, in some embodiments associated with the sequence of vehicle actions 604 (e.g., in FIG. 6), the first action level (e.g., corresponding to "move in a trip" 604A) is followed successively by a second action level (e.g., corresponding to "stay on highway" 604B), a third action level (e.g., corresponding to "keep moving 604C), a fourth action level (e.g., corresponding to "take over, left" 604D), and a fifth action level (e.g., corresponding to "speed up" 604E or "accelerate").

Figure 11:
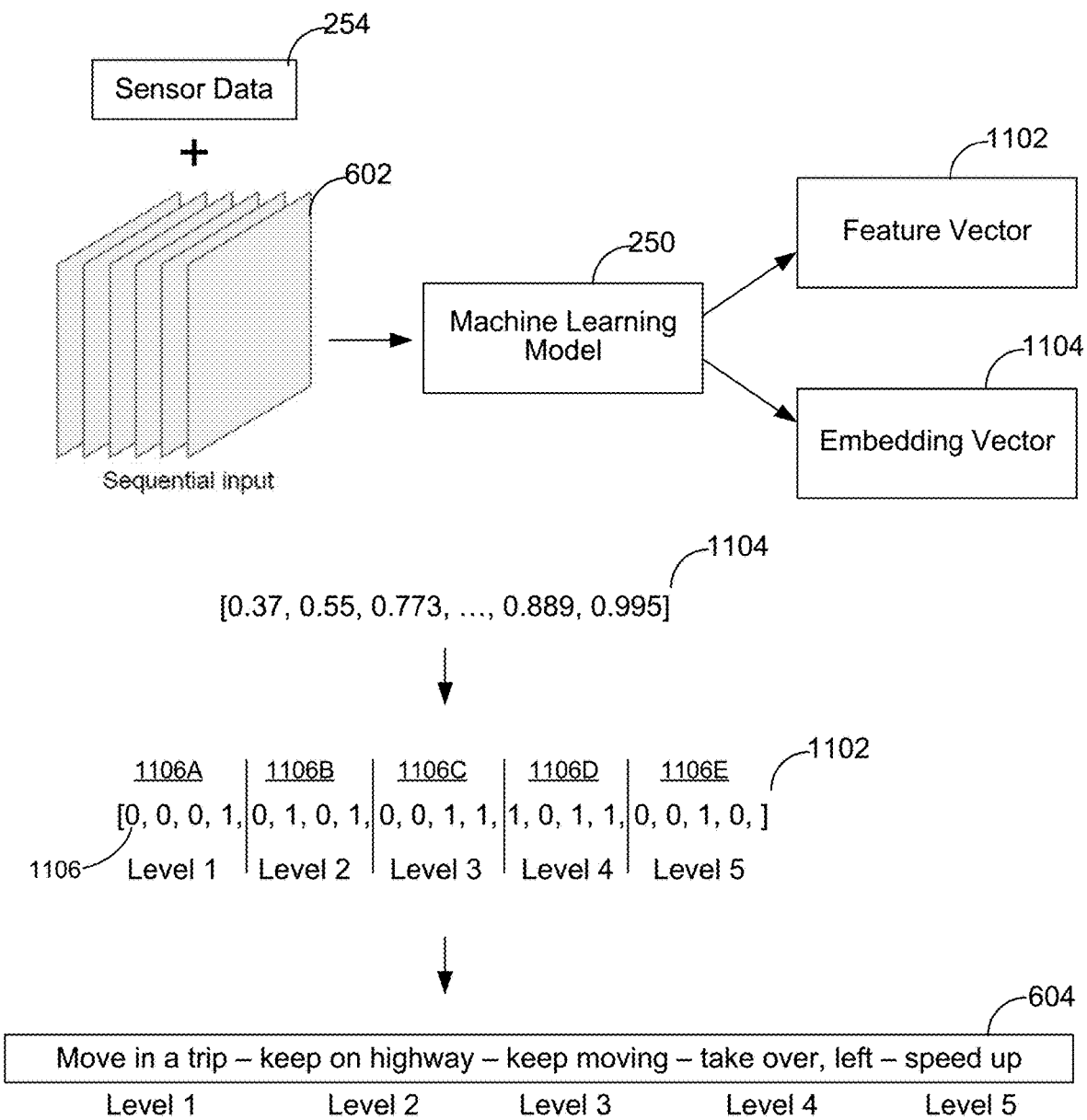
FIG. 11 is a diagram of an example machine learning model receiving one or more images and predicting a sequence of vehicle actions represented in one or more vectors, in accordance with some embodiments.

FIG. 11 is a diagram of an example machine learning model 250 receiving one or more images 602 and predicting a sequence of vehicle actions 604 represented in one or more vectors (e.g., feature vector 1102, embedding vector 1104), in accordance with some embodiments. The machine learning model 250 is configured to output a feature vector 1102 including a plurality of elements 1106 divided into a plurality of subsets of elements 1106A-1106E. Each vehicle action of the sequence of vehicle actions 604, which is predicted by the machine learning model 250, corresponds to a distinct action level, and is represented by a distinct subset of elements 1106 of the feature vector 1102. For example, the feature vector 1102 has 20 elements, and each element is optionally equal to 0 or 1. The first action level (Level 1) corresponds to a first subset of four elements 1106A, and the second action level (Level 2) corresponds to a second subset of four elements 1106B. The third to fifth action levels (Levels 3-5) correspond to third to fifth subsets of four elements 1106C-1106E. Specifically, in accordance with the hierarchy of interconnected action levels 258, the first subset of four elements 1106A (i.e., a combination of 0, 0, 0, and 1) corresponds to a vehicle action of "move in a trip" 704 on the first action level. In some embodiments, two distinct combinations (e.g., [0, 1, 0, 0] and [0, 0, 1, 0]) are associated with the first subset of four elements 1106A, and correspond to the vehicle actions of "start a trip" 702 and "complete a trip" 706, respectively.

In some embodiments, the machine learning model 250 is applied to output an embedding vector 1104. The embedding vector 1104 is projected to a feature vector 1102 including a plurality of elements 1106. The plurality of elements 1106 are divided into a plurality of subsets of elements 1106A-

1106E. Each vehicle action of the sequence of vehicle actions 604, which is predicted by the machine learning model 250, corresponds to a distinct action level, and is represented by a distinct subset of elements of the feature vector 1102 projected from the embedding vector 1104.

In some embodiments, the machine learning model 250 includes a single end-to-end neural network. Examples of the machine learning model 250 include, but are not limited to, a hierarchical classification neural network (HiNet), a support vector machine (SVM) classifier, a multilayer perceptron (MLP) network, and a branch convolutional neural network (B-CNN). Further, in some embodiments, a server 104 obtains a plurality of training image sequences, and associates each training image sequence with a respective ground truth label representing a respective sequence of ground truth vehicle actions. The machine learning model 250 is applied to process each training image sequence and predict a sequence of vehicle actions represented by a result label, and is trained based on a loss between the respective result label and the ground truth label. The trained machine learning model 250 is provided to the first vehicle 102A.

Figure 12:
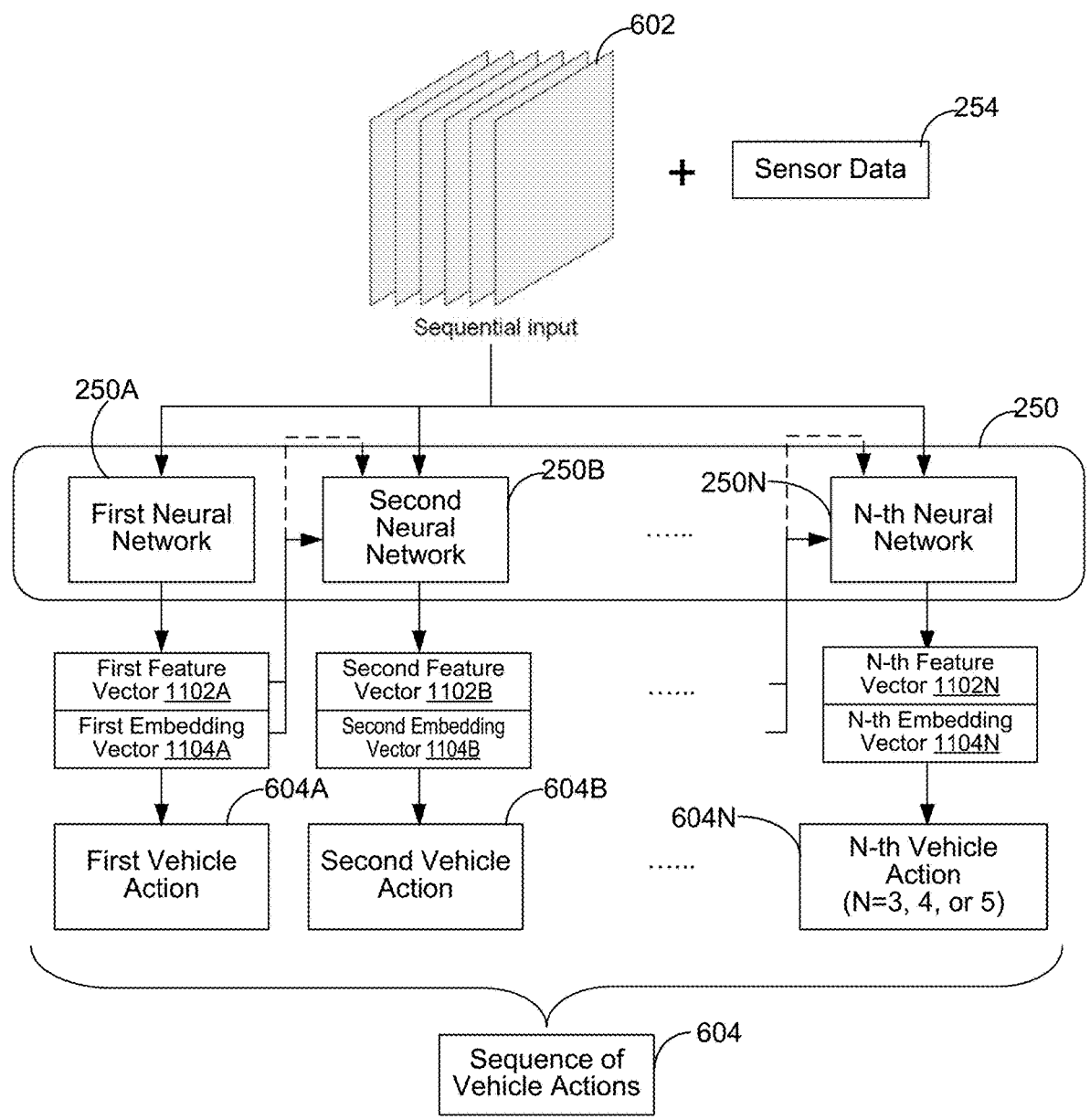
FIG. 12 is a diagram of another example machine learning model receiving one or more images and predicting a sequence of vehicle actions through a hierarchy of interconnected vehicle actions, in accordance with some embodiments.

FIG. 12 is a diagram of another example machine learning model 250 receiving one or more images 602 and predicting a sequence of vehicle actions 604 through a hierarchy of interconnected vehicle actions 258, in accordance with some embodiments. The machine learning model 250 includes a plurality of neural network models including a first neural network 250A and a second neural network 250B coupled to the first neural network 250A. When the machine learning model 250 is applied, the first vehicle 102A applies the first neural network 250A to process the one or more images 602 and predict a first vehicle action 604A of the sequence of vehicle actions 604 on a first action level (Level 1), and applies the second neural network 250B to predict a second vehicle action 604B of the sequence of vehicle actions 604 on a second action level (Level 2) following the first action level (Level 1) in the hierarchy of interconnected vehicle actions 258. The first neural network 250A outputs a first feature vector 1102A or embedding vector 1104A. The second neural network 250B processes the one or more images 602, the first feature vector 1102A or embedding vector 1104, or both, to predict the second vehicle action 604B (e.g., by way of outputting a second feature vector 1102B or embedding vector 1104B).

Further, in some embodiments, the second neural network 250B is selected from a set of candidate neural networks based on the predicted first vehicle action 604A. Additionally, in some embodiments, the machine learning network 250 includes an N-th neural network 250N that follows the first and second neural networks 250A and 250B. The N-th neural network 250N outputs an N-th vehicle action 604N in the sequence of vehicle actions 604. The N-th neural network 250N is selected based on the one or more images 602, the first feature or embedding vector, the second feature or embedding vector, or a subset thereof. Stated another way, a vehicle action predicted for a lower action level optionally depends on a vehicle action predicted for a higher action level.

In some embodiments, each neural network 250A, 250B, . . . , or 250N corresponds to a respective action level and is trained individually. Alternatively, in some embodiments, the plurality of neural networks of the machine learning model 250 are trained jointly in an end-to-end manner.

Additionally, referring to FIGS. 11 and 12, in some embodiments, the first vehicle 102A (FIG. 7) obtains sensor data 254 (FIG. 2) from at least one of a light detection and ranging (LiDAR) scanner and an inertial navigation system (INS) including accelerometers and gyroscopes. The machine learning model 250 (FIG. 2) is applied to process the one or more images 602 (FIG. 6) and sensor data 254 (FIG. 2) jointly to predict the sequence of vehicle actions 604 (FIG. 6) of the second vehicle 102B (FIG. 6) through the hierarchy of interconnected vehicle actions 258 (FIG. 2).

FIG. 13 is a flow diagram of an example method 1300 for predicting vehicle actions, in accordance with some embodiments. In some embodiments, the method 1300 is governed by instructions that are stored in a non-transitory computer readable storage medium (e.g., in memory 206 of a vehicle 102 in FIG. 2) and are executed by one or more processors of a vehicle 102 (e.g., one or more processors 202 of the vehicle 102 in FIG. 2). Each of the operations shown in FIG. 13 may correspond to instructions stored in the computer memory or computer readable storage medium (e.g., a vehicle action and behavior prediction module 240 in the memory 206 in FIG. 2) of the vehicle 102. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1300 may be combined and/or the order of some operations may be changed.

A first vehicle 102A (FIG. 6) obtains (1302) a hierarchy of interconnected vehicle actions 258 (FIG. 2) including a plurality of predefined vehicle actions that are organized to define a plurality of vehicle action sequences. After obtaining (1304) one or more image 602 (FIG. 6) of a road with a second vehicle 102B (FIG. 6) thereon, the first vehicle 102A predicts (1306) a sequence of vehicle actions 604 of the second vehicle 102B through the hierarchy of interconnected vehicle actions 258 using the one or more images 602. The first vehicle 102A is controlled (1308) to at least partially autonomously drive based on the predicted sequence of vehicle actions 604 (FIG. 6) of the second vehicle 102B. In some embodiments, additional images 602' (FIG. 6) of the road and second vehicle 102B are obtained and used to update the sequence of vehicle actions 604, predict a next sequence of vehicle actions 604' (FIG. 6) that follows the sequence of vehicle actions 604, or both. In some embodiments, the first vehicle 102A applies the machine learning model 250 (FIG. 2) to predict subsequent vehicle actions continuously and dynamically. More details are explained above with reference to vehicle action prediction are explained above with reference to at least FIG. 6.

In some embodiments, each of the plurality of vehicle action sequences includes a respective subset of vehicle actions that are ordered according to a plurality of action levels, and each vehicle action in the respective subset of vehicle actions corresponds to a distinct one of the plurality of action levels.

In some embodiments, the hierarchy of interconnected vehicle actions 258 includes (1310) a plurality of action levels having a first action level (Level 1), and the first action level is defined according to a stage of a trip and corresponds to three predefined vehicle actions of: "start a trip" 702, "move in a trip" 704, and "complete a trip" 706, each of the plurality of vehicle action sequences having a respective total number of action levels. Further, in some embodiments, the hierarchy of interconnected vehicle actions 258 includes at least three action levels. Additionally, in some embodiments, the first action level of the predicted sequence of vehicle actions 604 corresponds to a first vehicle action of "move in a trip" 704. A second action level of the predicted sequence of vehicle actions 604 immediately follows the first action level, and corresponds to a second vehicle action selected from a group consisting of: "keep on highway" 1002, "highway to local" 1004, "keep on local" 1006, and "local to highway" 1008. The predicted sequence of vehicle actions 604 has two or three additional actions each of which is on a distinct action level. Alternatively, in some embodiments, the first action level of the predicted sequence of vehicle actions 604 corresponds to a first vehicle action of "start a trip" 702 or "complete a trip" 706. A second action level of the predicted sequence of vehicle actions 604 immediately follows the first action level, and corresponds to a second vehicle action selected from a group consisting of: "garage" 802, "curbside" 804, and "parking lot" 806. A third action level (Level=3) of the predicted sequence of vehicle actions 604 immediately follows the second action level, and corresponds to a third vehicle action selected from a group consisting of: "wait" 808, "backoff" 810, "move forward" 812, "cut in" 814, and "pull in" 902.

In some embodiments, a machine learning model 250 (FIG. 6) is applied to process the one or more images 602 to predict the sequence of vehicle actions of the second vehicle 102B. The machine learning model 250 is configured to output a feature vector 1102 including a plurality of elements divided into a plurality of subsets of elements. Each vehicle action of the predicted sequence of vehicle actions 604 corresponds to a distinct action level, and is represented by a distinct subset of elements of the feature vector 1102. Further, in some embodiments, a server 104 obtains a plurality of training image sequences (e.g., training data 248 in FIGS. 2 and 3), and associates each training image sequence with a respective ground truth label representing a respective sequence of ground truth vehicle actions. The machine learning model 250 is to process each training image sequence and predict a sequence of training vehicle actions represented by a result label. The server 104 trains the machine learning model 250 based on a loss between the respective result label and the ground truth label. The trained machine learning model 250 is provided to the first vehicle 102A.

In some embodiments, a machine learning model 250 (FIG. 6) is applied to process the one or more images 602 to predict the sequence of vehicle actions of the second vehicle 102B. The machine learning model 250 is configured to output an embedding vector 1104. The embedding vector is projected (1312) to a feature vector 1102 including a plurality of elements that are divided into a plurality of subsets of elements 1106A-1106E. Each vehicle action of the predicted sequence of vehicle actions 604 corresponds (1314) to a distinct action level, and is represented by a distinct subset of elements of the feature vector 1102.

In some embodiments, a machine learning model 250 includes (1316) a single end-to-end neural network, and is applied to process the one or more images 602 to predict the sequence of vehicle actions of the second vehicle 102B. Examples of the machine learning model 250 include, but are not limited to, a hierarchical classification neural network (HiNet), a support vector machine (SVM) classifier, a multilayer perceptron (MLP) network, and a branch convolutional neural network (B-CNN).

In some embodiments, a machine learning model 250 includes (1318) a plurality of neural network models including a first neural network 250A and a second neural network 250B coupled to the first neural network 250A. The sequence of vehicle actions of the second vehicle is predicted by applying (1320) the first neural network 250A to process the one or more image 602 and predict a first vehicle action 604A of the sequence of vehicle actions 604 on a first action level and applying (1322) the second neural network 250B to predict a second vehicle action 604B of the sequence of vehicle actions 604 on a second action level following the first action level in the hierarchy of interconnected vehicle actions 258. In some embodiments, each of the first and second neural networks 250A and 250B corresponds to a respective action level and is trained individually. In some embodiments, the first neural network 250A generates a first feature vector 1102A or embedding vector 1104A, and the second neural network 250B process the first feature vector 1102A or embedding vector 1104A with the one or more image 602. Further, in some situations, the second neural network 250B is selected (1324) from a set of candidate neural networks based on the predicted first vehicle action 604A (i.e., based on the first feature vector 1102A or embedding vector 1104A). In some embodiments, a third neural network (e.g., the N-th feature vector 250N in FIG. 12) is selected and applied based on the first vehicle action 604A determined by the first neural network 250A, the second vehicle action 604B determined by the second neural network 250B, or a combination thereof.

In some embodiments, the second vehicle 102B is the first vehicle 102A, and the one or more image 602 of the road are captured by a camera 266 of the first vehicle 102A. Alternatively, in some embodiments, the second vehicle 102B is an obstacle vehicle that appears in a field of view of the first vehicle 102A, and obtaining the one or more image 602 further includes capturing the one or more image 602 of the road by a camera of the first vehicle 102A.

In some embodiments, in accordance with the predicted sequence of vehicle actions 604 of the second vehicle 102B, the first vehicle 102A visualizes on a graphical user interface of the first vehicle 102A a map 612 including a vehicle trajectory 614 of the second vehicle 102B.

In some embodiments, the first vehicle 102A determines that the predicted sequence of vehicle actions 604 satisfies a high frequency action sequence criterion. The first vehicle 102A is controlled by adjusting a vehicle control plan in accordance with a determination that the predicted sequence of vehicle actions 604 satisfies the high frequency action sequence criterion.

In some embodiments, the one or more image 602 include at least one LiDAR image. In some embodiments, sensor data 254 collected by non-camera sensors 260 are used jointly with the one or more image 602 to predict the sequence of vehicle actions 604. Specifically, in some embodiments, the sensor data 254 is obtained sensor data from at least one of a light detection and ranging (LiDAR) scanner 264 and an inertial navigation system (INS) 276 including accelerometers and gyroscopes. The machine learning model 250 is applied to process the one or more image 602 and sensor data 254 jointly to predict the sequence of vehicle actions 604 of the second vehicle 102B through the hierarchy of interconnected vehicle actions 258.

In some embodiments, the first vehicle 102A determines that the second vehicle 102B is within a predefined distance of the first vehicle 102A. The machine learning model 250 is applied to predict the sequence of vehicle actions 604 of the second vehicle 102B in accordance with a determination that the second vehicle 102B is within the predefined distance (e.g., 100 meters) of the first vehicle 102A.

It should be understood that the particular order in which the operations in FIG. 13 have been described are merely exemplary and are not intended to indicate that the described order is the only order in which the operations could be performed. One of ordinary skill in the art would recognize various ways to creating an aerial view and at least partially autonomously driving a vehicle accordingly. Additionally, it should be noted that details described with respect to FIGS. 1-12 and 14 are also applicable in an analogous manner to the method 1300 described above with respect to FIG. 13. For brevity, these details are not repeated here.

In various embodiments of this application, the method 1300 for predicting vehicle actions is implemented to predict a sequence of hierarchical action levels (also called intentions), thereby helping the first vehicle 102A (e.g., an ego vehicle) understand what the second vehicle 102B (e.g., an obstacle vehicle) will do from a high level (e.g. purpose) to a low level (e.g. next moving step). This also helps the first vehicle 102A understand long term vehicle behaviors as well.

In one or more examples, the functions described may be implemented in hardware, software, firmware, or any combination thereof If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first vehicle could be termed a second vehicle, and, similarly, a second vehicle could be termed a first vehicle, without departing from the scope of the embodiments. The first vehicle and the second vehicle are both vehicle, but they are not the same vehicle if not explained in some specific embodiments.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for predicting vehicle actions, comprising:
at a first vehicle including one or more processors and memory:
obtaining a hierarchy of interconnected vehicle actions including a plurality of predefined vehicle actions that are organized to define a plurality of vehicle action sequences;
obtaining one or more images of a road with a second vehicle thereon;
predicting a sequence of vehicle actions of the second vehicle through the hierarchy of interconnected vehicle actions using the one or more images; and
controlling the first vehicle to at least partially autonomously drive based on the predicted sequence of vehicle actions of the second vehicle;
wherein the hierarchy of interconnected vehicle actions includes a plurality of action levels having a first action level, and the first action level is defined according to a stage of a trip and corresponds to at least three predefined vehicle actions of: "start a trip," "move in the trip," and "complete a trip," each of the plurality of vehicle action sequences having a respective total number of action levels.

2. The method of claim 1, wherein each of the plurality of vehicle action sequences includes a respective subset of vehicle actions that are ordered according to a plurality of action levels, and each vehicle action in the respective subset of vehicle actions corresponds to a distinct one of the plurality of action levels.

3. The method of claim 1, wherein:
the first action level of the predicted sequence of vehicle actions corresponds to a first vehicle action of "move in a trip";
a second action level of the predicted sequence of vehicle actions immediately follows the first action level, and corresponds to a second vehicle action selected from a group consisting of: "keep on highway," "highway to local," "keep on local," and "local to highway"; and
the predicted sequence of vehicle actions has two or three additional actions each of which is on a distinct action level.

4. The method of claim 1, wherein:
the first action level of the predicted sequence of vehicle actions corresponds to a first vehicle action of "start a trip" or "complete a trip";
a second action level of the predicted sequence of vehicle actions immediately follows the first action level, and corresponds to a second vehicle action selected from a group consisting of: "garage," "curbside," and "parking lot"; and
a third action level of the predicted sequence of vehicle actions immediately follows the second action level, and corresponds to a third vehicle action selected from a group consisting of: "wait," "backoff," "move forward," "cut in," and "pull in.".

5. The method of claim 1, wherein:
a machine learning model is applied to process the one or more images to predict the sequence of vehicle actions of the second vehicle;
the machine learning model is configured to output a feature vector including a plurality of elements divided into a plurality of subsets of elements; and
each vehicle action of the predicted sequence of vehicle actions corresponds to a distinct action level, and is represented by a distinct subset of elements of the feature vector.

6. The method of claim 5, further comprising, at a server:
obtaining a plurality of training image sequences;
associating each training image sequence with a respective ground truth label representing a respective sequence of ground truth vehicle actions;
applying the machine learning model to process each training image sequence and predict a sequence of training vehicle actions represented by a respective result label; and
training the machine learning model based on a loss between the respective result label and the respective ground truth label, wherein the trained machine learning model is provided to the first vehicle.

7. The method of claim 1, wherein:
a machine learning model is applied to process the one or more images to predict the sequence of vehicle actions of the second vehicle;
the machine learning model is configured to output an embedding vector;
the method further comprises projecting the embedding vector to a feature vector including a plurality of elements that are divided into a plurality of subsets of elements; and
each vehicle action of the predicted sequence of vehicle actions corresponds to a distinct action level, and is represented by a distinct subset of elements of the feature vector.

8. The method of claim 1, wherein a machine learning model includes a plurality of neural network models including a first neural network and a second neural network coupled to the first neural network, predicting the sequence of vehicle actions of the second vehicle further comprising:
applying the first neural network to process the one or more images and predict a first vehicle action of the sequence of vehicle actions on a first action level; and
applying a second neural network to predict a second vehicle action of the sequence of vehicle actions on a second action level following the first action level in the hierarchy of interconnected vehicle actions.

9. The method of claim 8, predicting the sequence of vehicle actions of the second vehicle further comprising:
selecting the second neural network from a set of candidate neural networks based on the first vehicle action.

10. The method of claim 1, wherein a machine learning model includes a single end-to-end neural network, and is applied to process the one or more images to predict the sequence of vehicle actions of the second vehicle.

11. A vehicle, comprising:
a plurality of sensors;
a vehicle control system;
one or more processors; and
memory storing one or more programs configured for execution by the one or more processors, the one or more programs comprising instructions for:
obtaining a hierarchy of interconnected vehicle actions including a plurality of predefined vehicle actions that are organized to define a plurality of vehicle action sequences, the vehicle including a first vehicle;
obtaining one or more images of a road with a second vehicle thereon;
predicting a sequence of vehicle actions of the second vehicle through the hierarchy of interconnected vehicle actions using the one or more images; and
controlling the first vehicle to at least partially autonomously drive based on the predicted sequence of vehicle actions of the second vehicle;
wherein the hierarchy of interconnected vehicle actions includes a plurality of action levels having a first action level, and the first action level is defined according to a stage of a trip and corresponds to at least three predefined vehicle actions of: "start a trip," "move in the trip," and "complete a trip," each of the plurality of vehicle action sequences having a respective total number of action levels.

12. The vehicle of claim 11, wherein the second vehicle is an obstacle vehicle that appears in a field of view of the first vehicle, and obtaining the one or more images further comprises capturing the one or more images of the road by a camera of the first vehicle.

13. The vehicle of claim 11, the one or more programs further comprising instructions for:
in accordance with the predicted sequence of vehicle actions of the second vehicle, visualizing on a graphical user interface of the first vehicle a map including a vehicle trajectory of the second vehicle.

14. The vehicle of claim 11, wherein:
the first action level of the predicted sequence of vehicle actions corresponds to a first vehicle action of "move in a trip";
a second action level of the predicted sequence of vehicle actions immediately follows the first action level, and corresponds to a second vehicle action selected from a group consisting of: "keep on highway," "highway to local," "keep on local," and "local to highway"; and
the predicted sequence of vehicle actions has two or three additional actions each of which is on a distinct action level.

15. A non-transitory computer-readable storage medium storing one or more programs configured for execution by one or more processors of a first vehicle, the vehicle further including a plurality of sensors and a vehicle control system, the one or more programs comprising instructions for:
obtaining a hierarchy of interconnected vehicle actions including a plurality of predefined vehicle actions that are organized to define a plurality of vehicle action sequences;
obtaining one or more images of a road with a second vehicle thereon;
predicting a sequence of vehicle actions of the second vehicle through the hierarchy of interconnected vehicle actions using the one or more images; and
controlling the first vehicle to at least partially autonomously drive based on the predicted sequence of vehicle actions of the second vehicle;
wherein the hierarchy of interconnected vehicle actions includes a plurality of action levels having a first action level, and the first action level is defined according to a stage of a trip and corresponds to at least three predefined vehicle actions of: "start a trip," "move in the trip," and "complete a trip," each of the plurality of vehicle action sequences having a respective total number of action levels.

16. The non-transitory computer-readable storage medium of claim 15, the one or more programs further comprising instructions for determining that the predicted sequence of vehicle actions satisfies a high frequency action sequence criterion, wherein controlling the first vehicle further includes adjusting a vehicle control plan in accordance with a determination that the predicted sequence of vehicle actions satisfies the high frequency action sequence criterion.

17. The non-transitory computer-readable storage medium of claim 15, wherein the one or more images include at least one light detection and ranging (LiDAR) image.

18. The non-transitory computer-readable storage medium of claim 15, the one or more programs further comprising instructions for:
   obtaining sensor data from at least one of a light detection and ranging (LiDAR) scanner and an inertial navigation system (INS) including accelerometers and gyroscopes;
   wherein a machine learning model is applied to process the one or more images and sensor data jointly to predict the sequence of vehicle actions of the second vehicle through the hierarchy of interconnected vehicle actions.

19. The non-transitory computer-readable storage medium of claim 15, the one or more programs further comprising instructions for:
   determining that the second vehicle is within a predefined distance of the first vehicle, wherein a machine learning model is applied to predict the sequence of vehicle actions of the second vehicle in accordance with a determination that the second vehicle is within the predefined distance of the first vehicle.

20. The non-transitory computer-readable storage medium of claim 15, wherein:
   the first action level of the predicted sequence of vehicle actions corresponds to a first vehicle action of "move in a trip";
   a second action level of the predicted sequence of vehicle actions immediately follows the first action level, and corresponds to a second vehicle action selected from a group consisting of: "keep on highway," "highway to local," "keep on local," and "local to highway"; and
   the predicted sequence of vehicle actions has two or three additional actions each of which is on a distinct action level.

\* \* \* \* \*